Dec. 24, 1929. T. E. MILLES 1,741,065
ANTISKID DEVICE
Filed April 1, 1929  2 Sheets-Sheet 1
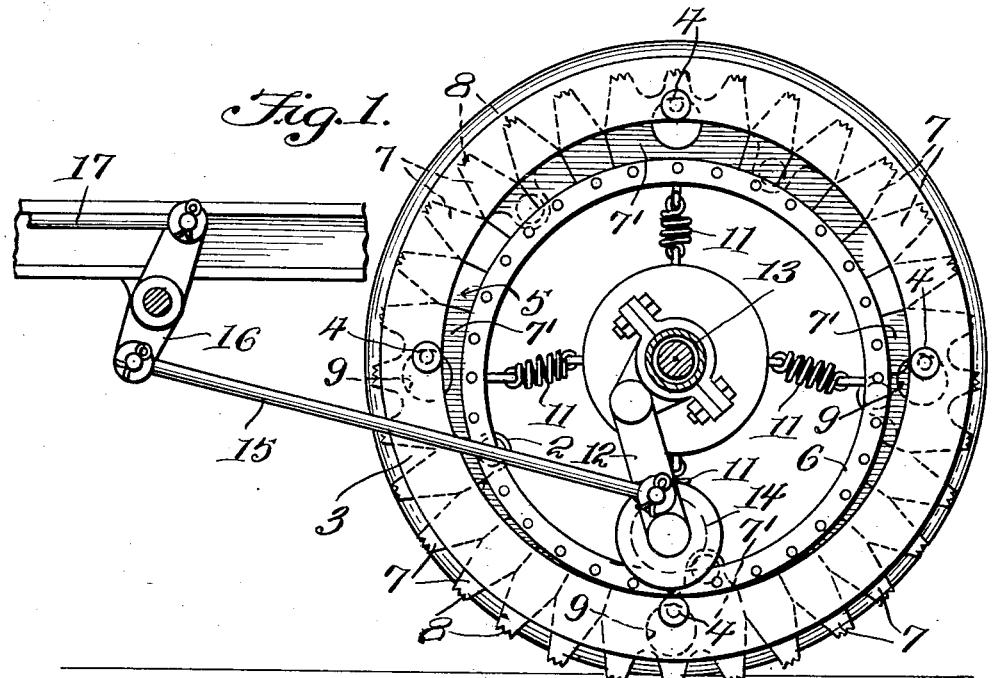
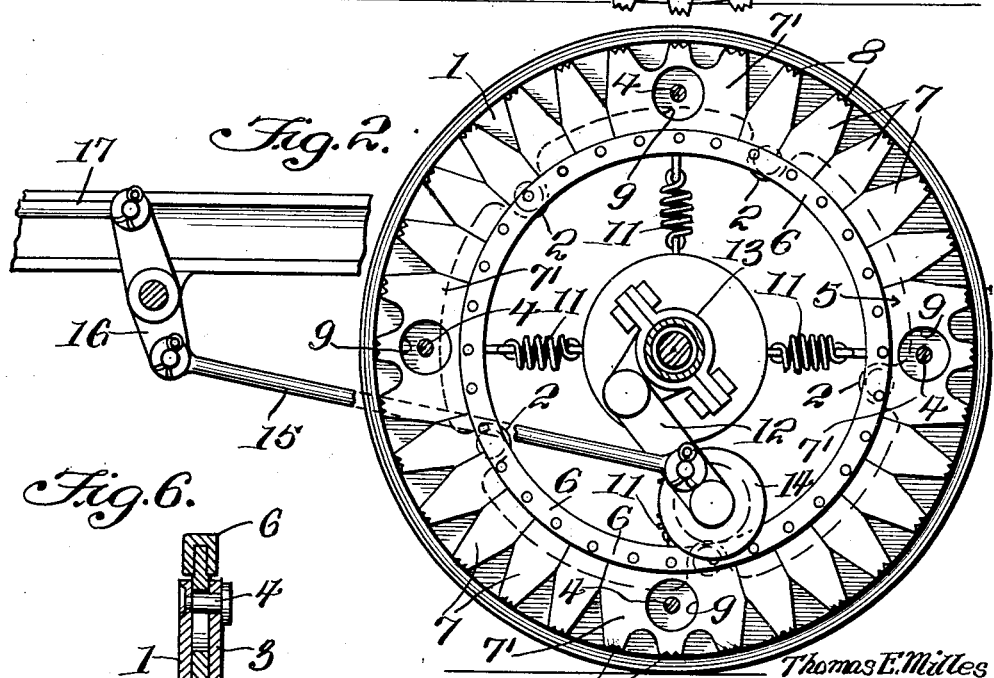
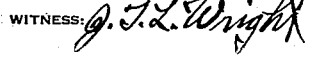
Thomas E. Milles
INVENTOR
BY Victor J. Evans
ATTORNEY Dec. 24, 1929.   T. E. MILLES   1,741,065
ANTISKID DEVICE
Filed April 1, 1929   2 Sheets-Sheet 2
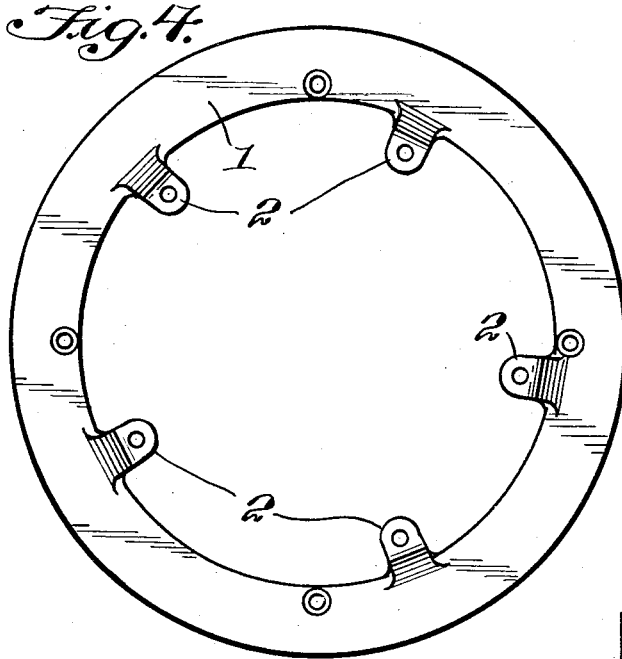
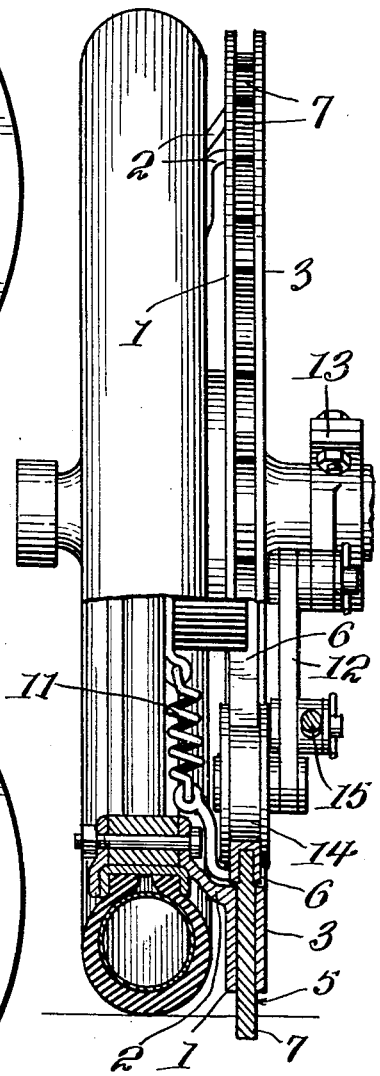
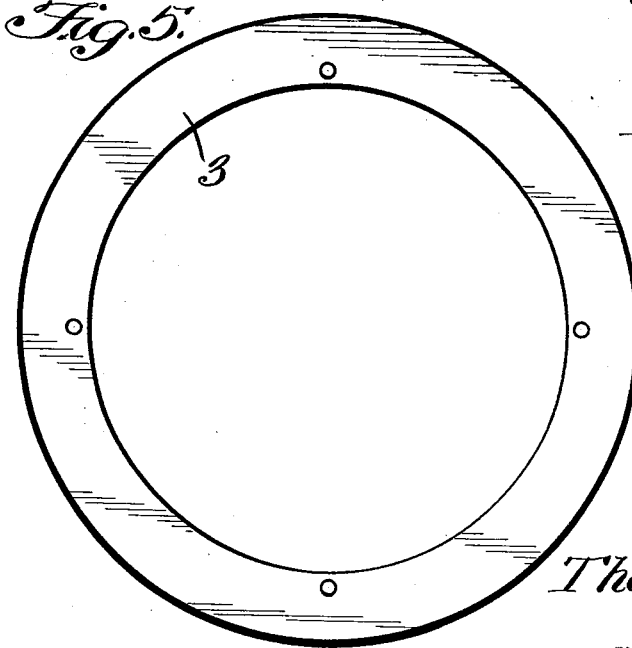
Thomas E. Milles
INVENTOR
BY Victor J. Evans
ATTORNEY
WITNESS: J. T. L. Wright Patented Dec. 24, 1929

1,741,065

UNITED STATES PATENT OFFICE

THOMAS E. MILLES, OF McKEES ROCKS, PENNSYLVANIA

ANTI-SKID DEVICE

Application filed April 1, 1929. Serial No. 351,756.

This invention relates to an anti-skid device for the wheels of vehicles, the general object of the invention being to provide a ring-shaped member having fingers or lugs thereon for engaging the road surface, as the wheel of the vehicle rotates to prevent skidding or slipping of the wheel, with springs for normally holding the ring member concentric with the wheel, with the fingers out of contact with the surface and means, operated by the driver or operator of the vehicle, for moving the ring member to an eccentric position relative to the vehicle wheel whereby the fingers or lugs will engage the road surface as the vehicle wheel revolves and thus prevent skidding or slipping of the wheel.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view showing the inner face of a vehicle wheel equipped with the device, the view also showing a part of the vehicle frame and the operating means for the device.

Figure 2 is a similar view but showing the device in inoperative position.

Figure 3 is an edge view of the wheel and the device, parts being in section.

Figure 4 is a view of the ring plate which is to be attached to the wheel.

Figure 5 is a view of the other ring plate.

Figure 6 is a section through the device.

In the drawings, the numeral 1 indicates a ring-shaped plate formed with the offset ears 2 which are bolted or otherwise attached to the wheel of the vehicle, and the numeral 3 indicates another ring-shaped plate which is fastened to the first plate in spaced relation by the bolts 4. A ring-shaped member 5 is movably positioned between the plates 1 and 3, this member comprising a channeled ring 6 and the fingers or lugs 7 having their inner ends held in the channel by rivets or the like, the outer portions of the fingers or lugs being tapered, with their extremities formed with teeth or roughened, as shown at 8. The member 5 is of greater radial depth than the plates with the outer parts of the fingers or lugs projecting beyond the outer peripheries of the plates and the channeled part located within the opening formed by the inner peripheries of the plates. Some of the teeth or lugs are made of considerable width, as shown at 7', and these lugs have large circular openings 9 therein, through which the bolts 4 pass which connect the ring-shaped plates together. Springs 11 are connected with portions of the hub of the wheel and with the channel 6 and act to hold the member 5 concentrically with the wheel, and as said member is of less diameter than the wheel, in this position of the member, the roughened ends of the lugs are held out of contact with the road surface, as will be seen from Figure 2.

An arm 12 has its upper end pivoted to a bracket 13 on the wheel axle or housing, and a roller 14 is carried by the lower end of the arm, this roller engaging the channel-shaped ring 6. A link 15 connects the arm 12 with a lever 16 pivoted to a side member of the chassis and a link 17 is connected to the upper end of the lever 16 and is also connected to an operating member so that when said member is actuated, the lever 16 will be rocked and the link 15 will swing the arm 12 downwardly and thus cause the roller 14 to force the member 5 to an eccentric position relative to the wheel so that the lugs will engage the road surface, as shown in Figure 1. As soon as pressure is released from the arm 12, the springs 11 will return the parts to inoperative position and thus the lugs will not contact the road surface.

It will, of course, be understood that one of these devices is placed on each rear wheel of the vehicle and that the links 17 may be connected to a shaft journaled in the chassis and connected with a foot pedal or hand lever arranged adjacent the driver's seat so that when the said shaft is rocked, both devices will be moved to a position where they will engage the road surface.

Thus I have provided simple means for preventing a vehicle from skidding, the devices being always attached to the wheels and ready to be moved into operative position by a movement of a foot pedal or hand lever. As soon as the need of the anti-skid devices is removed, it is simply necessary to release the pedal or lever, when the springs will return the parts to inoperative position.

As the device is placed on the inside of the wheel, it is hidden from view and, therefore, does not detract from the appearance of the vehicle.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An anti-skid device for a vehicle wheel, comprising a ring-shaped member having lugs on its periphery, said member, with the lugs, being of smaller diameter than the wheel, means for normally holding the member in a concentric position with respect to the wheel and means for lowering the member whereby the lugs will engage the road surface as the wheel revolves.

2. An anti-skid device for a vehicle wheel, comprising a ring-shaped member having lugs on its outer periphery, spring means for normally holding the member in raised position with its lugs out of contact with the road surface and means for lowering the member whereby the lugs will engage the surface as the wheel revolves.

3. An anti-skid device for a vehicle wheel, comprising a pair of spaced rings, means for attaching one ring to a wheel, a ring-shaped member movably supported between the rings and composed of a ring part and lugs attached to the outer periphery of said part, springs connecting the ring part to the hub of the wheel and normally holding the ring-shaped member in a position concentric with the wheel, an arm pivoted to a stationary part, a roller at the lower end of the arm and means for swinging the arm downwardly to cause the roller to move the ring-shaped member to an eccentric position relative to the wheel, whereby the lugs will engage the road surface as the wheel revolves.

In testimony whereof I affix my signature.

THOMAS E. MILLES.